(12) United States Patent
Yang et al.

(10) Patent No.: US 8,463,335 B2
(45) Date of Patent: Jun. 11, 2013

(54) BATTERY COVER ASSEMBLY FOR PORTABLE ELECTRONIC DEVICE

(75) Inventors: Mu-Wen Yang, Taipei (TW); Chih-Chiang Chang, Taipei (TW)

(73) Assignee: FIH (Hong Kong) Limited, Kowloon (HK)

( * ) Notice: Subject to any disclaimer, the term of this patent is extended or adjusted under 35 U.S.C. 154(b) by 510 days.

(21) Appl. No.: 12/780,038

(22) Filed: May 14, 2010

(65) Prior Publication Data
US 2010/0331042 A1 Dec. 30, 2010

(30) Foreign Application Priority Data
Jun. 25, 2009 (CN) .......................... 2009 1 0303686

(51) Int. Cl.
| | |
|---|---|
| H04B 1/38 | (2006.01) |
| H04M 1/00 | (2006.01) |
| H04M 9/00 | (2006.01) |
| H04N 7/14 | (2006.01) |
| H04N 5/225 | (2006.01) |
| H05K 5/00 | (2006.01) |
| H05K 7/00 | (2006.01) |
| H05K 7/20 | (2006.01) |
| G06F 1/16 | (2006.01) |
| G06F 1/20 | (2006.01) |
| G03B 17/04 | (2006.01) |
| G03B 17/48 | (2006.01) |
| G03B 19/00 | (2006.01) |
| G03B 29/00 | (2006.01) |

(52) U.S. Cl.
USPC ................. 455/575.1; 455/90.3; 455/550.1; 455/566; 348/14.02; 348/376; 361/679.01; 361/679.08; 379/426; 379/433.12; 396/348; 396/429

(58) Field of Classification Search
USPC ................. 455/73, 90.1, 90.3, 128, 347, 425, 455/426.1, 550.1, 556.1, 566, 569.1, 575.1, 455/575.2, 575.3, 575.4, 575.8; 340/572.1, 340/686.1, 686.2, 686.3, 686.4, 687, 689, 340/93; 341/14.16, 374, 376; 361/679.01, 361/679.3, 679.08, 679.28, 679.39, 679.55, 361/679.58, 726, 755; 379/426, 433.01, 433.12; 396/287, 348, 429, 448; 429/96, 97, 100, 429/163; 312/334.1; 349/60, 144
See application file for complete search history.

(56) References Cited

U.S. PATENT DOCUMENTS

| | | | | |
|---|---|---|---|---|
| 5,485,517 | A * | 1/1996 | Gray ........................ | 379/433.13 |
| 7,142,667 | B2 * | 11/2006 | Harmon et al. .......... | 379/433.13 |
| 7,200,429 | B2 * | 4/2007 | Park et al. ................. | 455/575.4 |
| 7,369,882 | B2 * | 5/2008 | Hwang et al. ............. | 455/575.1 |
| 7,630,624 | B2 * | 12/2009 | Chang ......................... | 396/144 |
| 7,665,913 | B2 * | 2/2010 | Kim .............................. | 396/448 |
| 2004/0132482 | A1 * | 7/2004 | Kang et al. ................. | 455/550.1 |
| 2005/0063144 | A1 * | 3/2005 | Park et al. .................... | 361/681 |
| 2006/0104628 | A1 * | 5/2006 | Hasegawa et al. ........... | 396/287 |

(Continued)

Primary Examiner — Andrew Wendell
Assistant Examiner — Paul P Tran
(74) Attorney, Agent, or Firm — Altis Law Group, Inc.

(57) ABSTRACT

A battery cover assembly for a portable electronic device is disclosed including a base member, a first cover member mating with the base member, a second cover member positioned between the base member and the first cover member, a third cover member engaging with the first cover member, a camera assembly secured to the base member, and a locking assembly engaging with the third cover member. The first cover member can horizontally rotate along the second cover member. The first cover member is rotatably attached to, and cannot be detached from the base member.

10 Claims, 6 Drawing Sheets

U.S. PATENT DOCUMENTS

2006/0148425 A1* 7/2006 Carlson ........................ 455/90.3
2006/0192525 A1* 8/2006 Qin et al. ...................... 320/107
2007/0054522 A1* 3/2007 Choi et al. .................... 439/144
2007/0293283 A1* 12/2007 Inubushi et al. ........... 455/575.1

\* cited by examiner

BATTERY COVER ASSEMBLY FOR PORTABLE ELECTRONIC DEVICE

BACKGROUND

1. Technical Field

The disclosure relates to battery cover assembly used in a portable electronic device.

2. Description of Related Art

Portable electronic devices usually use battery covers to allow installation and removal of batteries. A typical battery cover is attached to a housing of a portable electronic device, with a pair of hooks at one end of the battery cover and a locking pin at the other end of the battery cover. A pair of grooves and a locking hole are defined in the housing. In assembly, the hooks are inserted into the grooves. The battery cover is pressed downward onto the housing until the locking pin is inserted into the locking hole. During installation and removal of the battery, the battery cover must be detached from the housing at which point it can be misplaced by a user.

Therefore, there is room for improvement within the art.

BRIEF DESCRIPTION OF THE DRAWINGS

Many aspects of the present battery cover assembly for portable electronic device can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
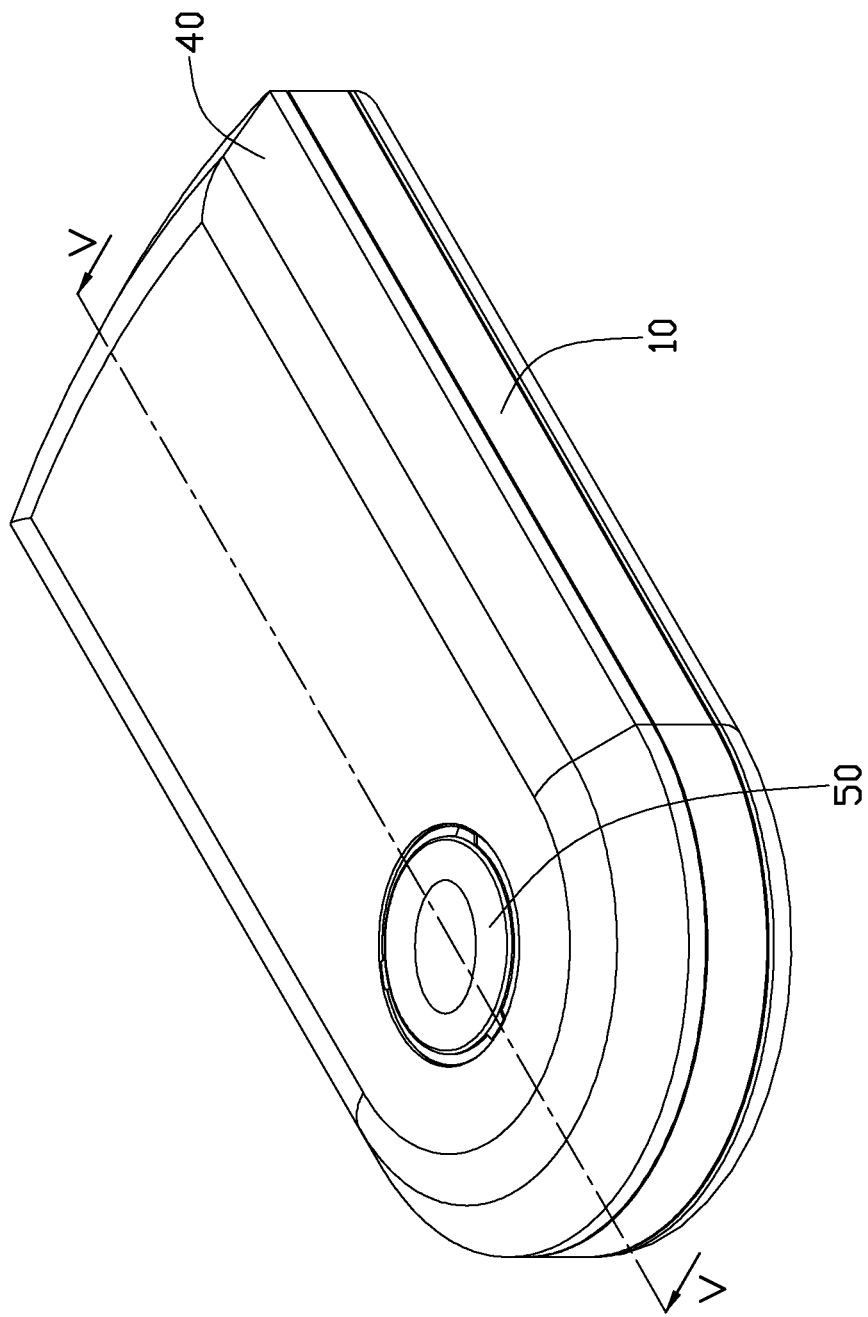
FIG. 1 is an isometric exploded view of a battery cover assembly for a portable electronic device in a closed position according to an exemplary embodiment of the disclosure.
Figure 2:
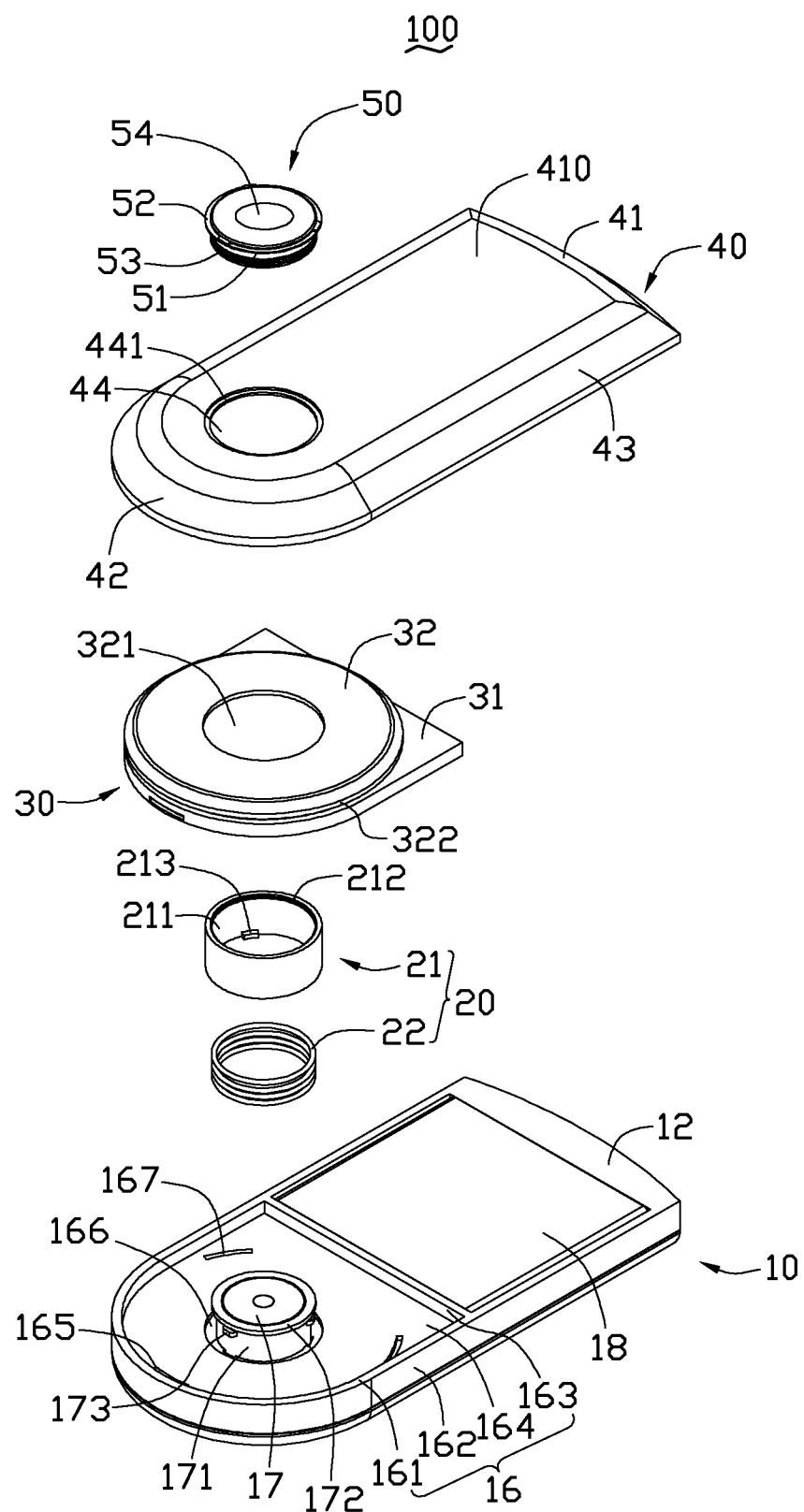
FIG. 2 is an exploded view of the battery cover assembly shown in FIG. 1.
Figure 3:
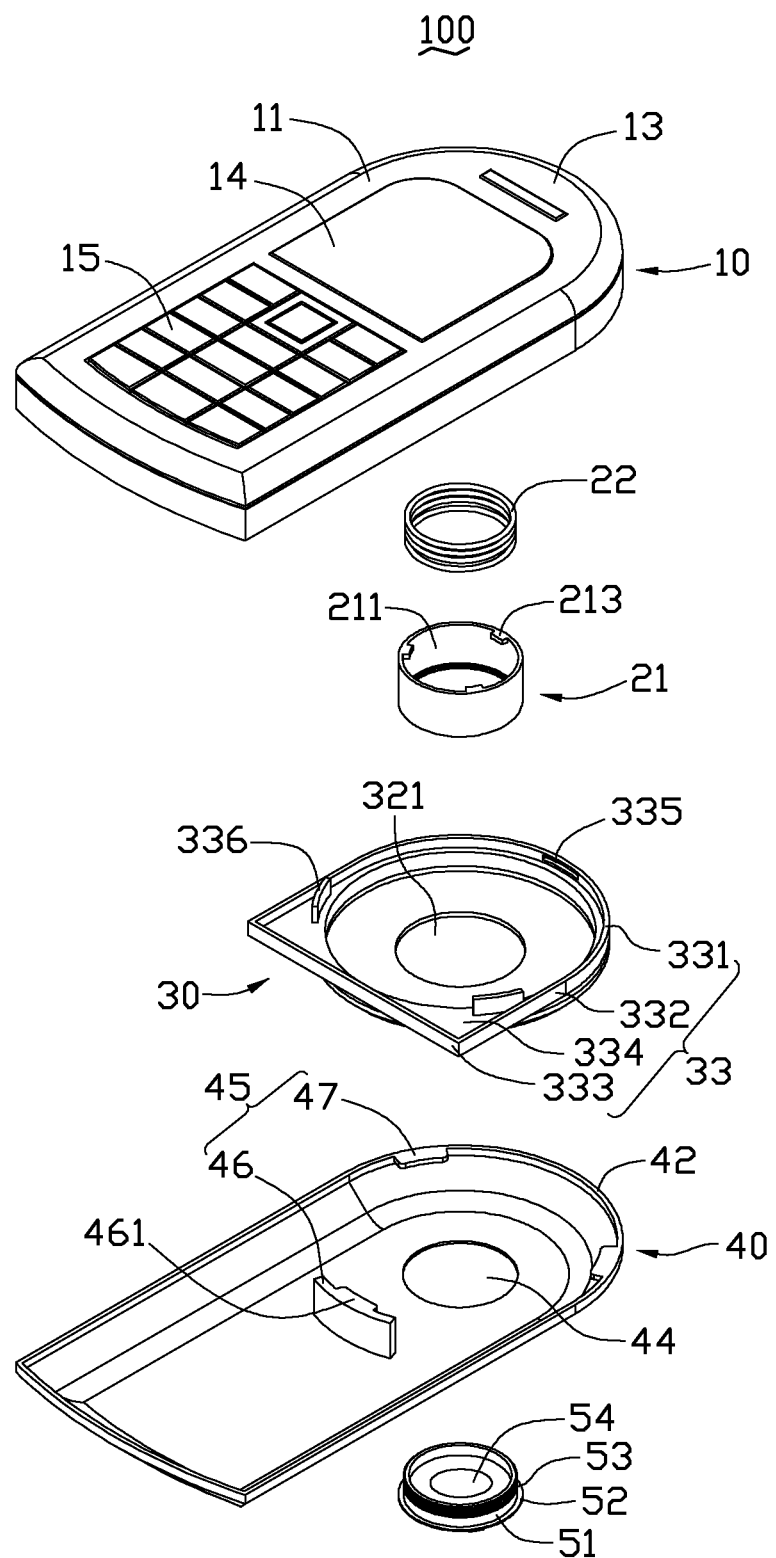
FIG. 3 is another exploded view of the battery cover assembly shown in FIG. 1.

FIGS. 1 through 3 show an exemplary battery cover assembly 100 for a portable electronic device such as mobile phone. The assembly 100 includes a base member 10, a first cover member 40, a second cover member 30, a third cover member 50, a camera assembly 17, and a locking assembly 20.

The base member 10 can be a housing of the portable electronic device. The base member 10 includes a front surface 11, a rear surface 12, an end portion 13, a display window 14, and a keypad 15. The display window 14 and the keypad 15 are assembled and exposed at the front surface 11. The rear surface 12 defines a recessed first mounting portion 16 and a recessed receiving space 18. The first mounting portion 16 is configured for mounting the camera assembly 17 and the locking assembly 20 therein. The receiving space 18 is configured for receiving a battery (not shown) therein.

The first mounting portion 16 is positioned opposite to the end portion 13. The first mounting portion 16 includes an arcuate peripheral wall 161, two parallel straight sidewalls 162, an end wall 163, and a bottom wall 164. The peripheral wall 161 has an arcuate first latching protrusion 165 protruding therefrom near the middle and towards the center of the first mounting portion 16. The bottom wall 164 defines a round recess 166 and two arcuate first latching slits 167. The round recess 166 is located near the center of the first mounting portion 16. The first latching slits 167 are located at two sides of the round recess 166.

The camera assembly 17 is generally cylindrical and fits into the round recess 166. The camera assembly 17 includes a holder 171, an annual resisting end portion 172, three first resisting protrusions 173, and a camera module (not shown) held inside and by the holder 171. The resisting end portion 172 is larger in diameter than the holder 171, and attaches to and surrounds the holder 171. The first resisting protrusions 173 are spaced from each other and protrude from the circumference of the holder 171, adjacent to the resisting end portion 172.

The locking assembly 20 can be placed around the camera assembly 17. The locking assembly 20 includes a cylindrical sleeve 21 and an elastic member 22. The sleeve 21 includes an internal wall 211, an internal screw thread 212 defined in a distal end of the internal wall 211, and three second resisting protrusions 213 corresponding to the first resisting protrusions 17. The second resisting protrusions 213 are spaced from each other and protrude from the circumference of an opposite distal end of the internal wall 211. The sleeve 21 can wrap around the camera assembly 17 and is partially secured in the round recess 166. The elastic member 22 can be a coiled spring surrounding the holder 171 with one end secured between and by the first resisting protrusion 173 and the resisting end portion 172, the other opposite end secured by the second resisting protrusions 213.

The second cover member 30 is an enclosure for enclosing various electronic components inside the portable electronic device. The second cover member 30 includes a main portion 31, a circular projection 32, and a second mounting portion 33. The projection 32 projects from the upper surface of the main portion 31 and defines a through hole 321 coaxial with the sleeve 21 and the holder 171. The conjunction of the main portion 31 and the projection 32 defines an arcuate positioning groove 322 surrounding a portion of the projection 32.

The second mounting portion 33 has substantially the same structure as the first mounting portion 16, including an arcuate peripheral wall 331, two parallel sidewalls 332, an end wall 333, and an upper wall 334. The peripheral wall 331 defines an arcuate second latching slit 335 corresponding to the first latching protrusion 165 near the middle, and the upper wall 334 has two second latching protrusions 336 corresponding to the first latching slits 167. The engaging of the first latching protrusion 165 into the second latching slits 335, and the second latching protrusions 336 into the first latching slits 167 facilitates the latching of the second cover member 30 to the base member 10. In this case, the second cover member 30 is immovably received in the first mounting portion 16.

The first cover member 40 can be a cover of the portable electronic device. The first cover member 40 is rotatably attached on the rear surface 12 of the base member 10, and can rotate between an open position and a closed position. In the closed position, the first cover member 40 engages with the base member 10 and covers the second cover member 30 and the receiving space 18. In the open position, the first cover member 40 remains attached to the base member 10, yet partially exposes the second cover member 30 and completely exposes the receiving space 18 to the outside.

The first cover member 40 includes a main body 41, a flange end wall 42, a flange sidewall 43, and a positioning assembly 45. The main body 41 includes a top wall 410. The top wall 410 defines a stepped through mounting hole 44 with an annual stepped surface 441. The positioning assembly 45 includes a positioning member 46 and two arcuate positioning flanges 47 at the same side of the first cover member 40. The positioning member 46 is positioned opposite to the top wall 410 and adjacent to the mounting hole 44, and includes a positioning projection 461 projecting from a distal end towards the mounting hole 44. The two positioning flanges 47 are located at two sides of the mounting hole 44. The two positioning flanges 421 and the positioning projection 461 are coplanar with each other.

The third cover member 50 can be placed in and covers the mounting hole 44 of the first cover member 40. The third cover member 50 includes a base portion 51, a peripheral end portion 52, an external screw thread 53, and a through aperture 54. The base portion 51 can be received in the mounting hole 44. The peripheral end portion 52 extends from the base portion 51 and resists against the stepped surface 441 of the mounting hole 44. The external screw thread 53 and the peripheral end portion 52 are oppositely arranged on two opposite ends of the base portion 51. The external screw thread 53 threadedly engages with the internal screw thread 212 of the sleeve 21. The through aperture 54 is defined through the center of the base portion 51.

Figure 4:
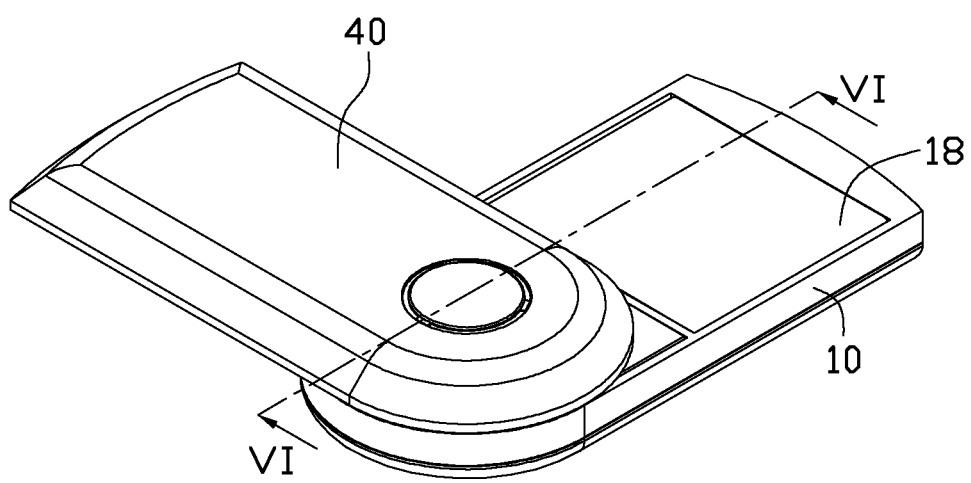
FIG. 4 is an isometric view of the battery cover assembly shown in FIG. 1 in an opened position.
Figure 5:
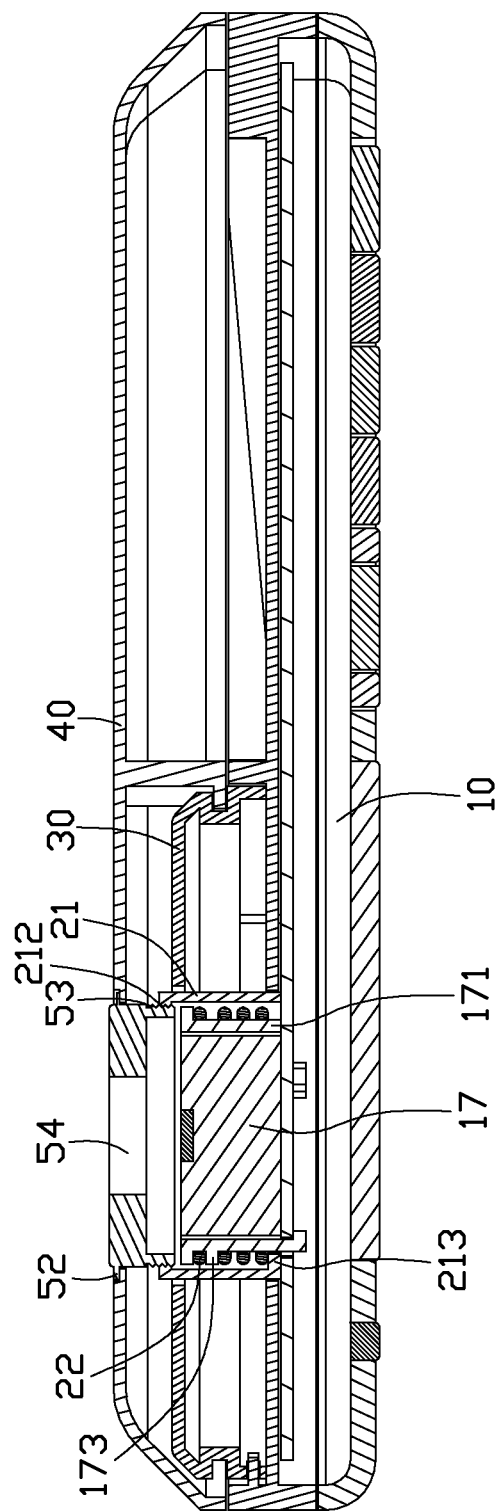
FIG. 5 is a cross sectional view of the battery cover assembly shown in FIG. 1 along line V-V.
Figure 6:
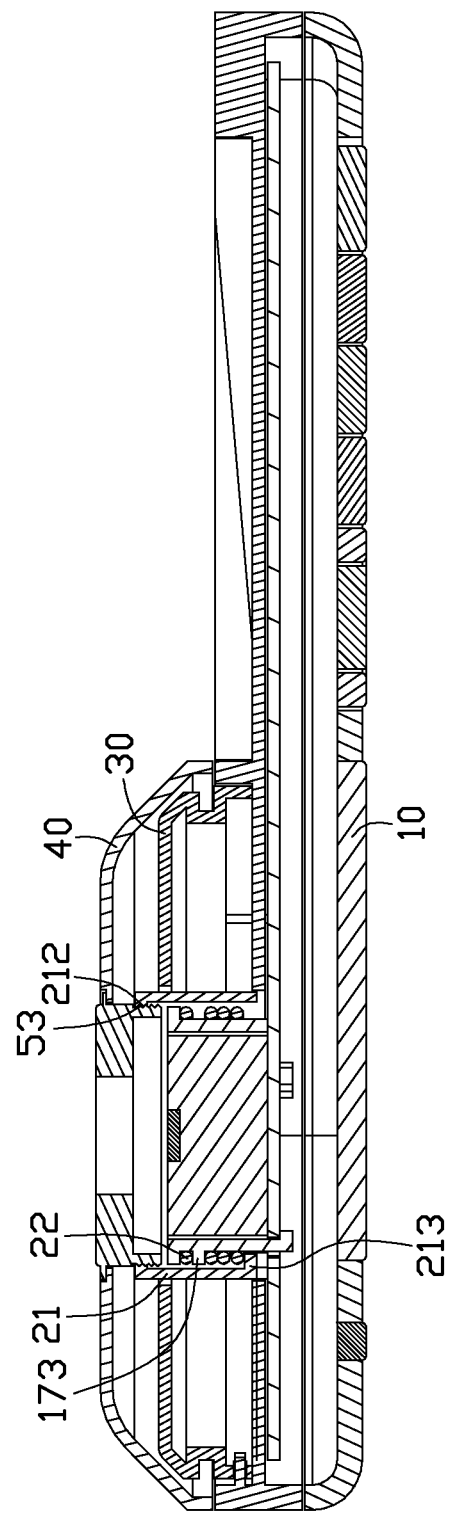
FIG. 6 is another cross sectional view of the battery cover assembly shown in FIG. 4 along line VI-VI.

During assembly, as shown in FIGS. 4 through 6, the elastic member 22 surrounds the holder 171 and has one end secured between the resisting end portion 172 and the first resisting protrusion 173. The round recess 166 fixes the holder 171 in place. The sleeve 21 surrounds the holder 171 and the elastic member 22 is compressed by the resisting of the second resisting protrusions 213 against the other end of the elastic member 22. The compression force of the elastic member 22 secures the sleeve 21 in the round recess 166. The second cover member 30 latches to the base member 10 by pushing against and latching the first latching protrusion 165 into the second latching slit 335, and the second latching protrusions 336 into the first latching slit 167. The sleeve 21 extends through the through hole 321.

The first cover member 40 covers the rear surface 12 of the base member 10, aligning the mounting hole 44 with the through hole 321. The positioning projection 461 and the positioning flanges 47 slide over the projection 32 into the positioning groove 322. The positioning force of the positioning member 46 and positioning flanges 47 maintains the position of the first cover member 40 relative to the base member 10. The third cover member 50 is received in the mounting hole 44 and the through hole 321, and fixed by rotating the third cover member 50 and screwing the external screw thread 53 with the internal screw thread 212. The peripheral end portion 52 is fixed to (e.g., adhered by an adhesive) the stepped surface 441. The assembly of the battery cover assembly is finished.

The battery cover assembly can be opened by an operator for installation or removal of the battery to and from the receiving space 18. During this process, the first cover member 40 rotates relative to the base member 10. Due to fixing of the end portion 52 to the stepped surface 441, the third cover member 50 rotates with the rotation of the first cover member 40. The positioning assembly 45 rotates along the positioning groove 322 around the projection 32. Due to threaded engagement, the rotation of the external screw thread 53 drives the internal screw thread 212 and the sleeve 21 to move upwardly along the holder 171. The second resisting protrusions 213 and the first resisting protrusion 173 further compress the elastic member 22, providing a gradually increasing tightening feeling to the operator. It is to be understood thnear the releasing of elastic member 22 when the battery cover assembly moved from the open position to the closed position would provide a loosening feeling to the operator.

During this opening process, the length of the positioning groove 322 limits the rotation of the first cover member 40 when the positioning assembly 45 is resisted by the ends of the positioning groove 322. Accordingly, the battery cover assembly can maintain the open position. It is to be understood in addition to this open position, the first cover member 40 can maintain at any position between the closed position and the open position by the positioning force of the positioning assembly 45 after removal of the operator's rotational driving force.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A battery cover assembly for a portable electronic device, comprising:
a base member;
a first cover member mating with the base member and defining a stepped through mounting hole;
a second cover member positioned between the base member and the first cover member and engaging with the first cover member such that the first cover member can horizontally rotate along the second cover member, the second cover member defining a through hole coaxial with the stepped through mounting hole;
a third cover member including an external screw thread and a peripheral end portion arranged opposite ends, the peripheral end portion received in the stepped through mounting hole of the first cover member;
a camera assembly secured to the base member and partially exposed through the through hole of the second cover member;
a locking assembly including a sleeve, the sleeve surrounding the camera assembly, the sleeve including an internal screw thread extending out of the through hole of the second cover member, the external screw thread of the third cover member screwing the internal screw thread for allowing the third cover member to be attached to the first cover member.

2. The battery cover assembly as claimed in claim 1, wherein the third cover member is secured to the first cover member, and the second cover member is secured to the base member, thereby the third cover member and the first cover member can integrally rotate relative to the unit of the second cover member and the base member.

3. The battery cover assembly as claimed in claim 1, wherein the locking assembly includes an elastic member, the elastic member deformably positioned between the camera assembly and the sleeve.

4. The battery cover assembly as claimed in claim 3, wherein the camera assembly comprises first resisting protrusions, the sleeve comprises second resisting protrusions, the elastic member compressed by and between the first and second resisting protrusions.

5. The battery cover assembly as claimed in claim 3, wherein the base member defines a recess receiving the sleeve, the sleeve configured to be moved relative to the recess by the rotation of the third cover member.

6. The battery cover assembly as claimed in claim 1, wherein the base member defines first latching slits and forms a first latching protrusion, the second cover member defines a second latching slit and forms second latching protrusions, the first latching protrusion latching into the second latching slit, and the second latching protrusions latching into the first latching slits.

7. The battery cover assembly as claimed in claim 1, wherein:
   the first cover member comprises a positioning member and two arcuate positioning flanges;
   the second cover member comprises a main portion and a circular projection in conjunction with the main portion, the conjunction of the main portion and the projection defines a positioning groove surrounding a portion of the projection;
   the positioning member and the arcuate positioning flanges slidably positioned in the positioning groove.

8. The battery cover assembly as claimed in claim 7, wherein the positioning member comprises a positioning projection projecting from a distal end, the two positioning flanges are located adjacent to the positioning projection, the two positioning flanges and the positioning projection are coplanar with each other and arranged along a circle, the circular projection is coaxial to the circle.

9. A portable electronic device, comprising:
   a housing;
   a first cover member mating with the housing, the first cover member defining a stepped through mounting hole;
   a battery cover assembly, comprising:
      a second cover member positioned between the housing and the first cover member and engaging with the first cover member such that the first cover member can horizontally rotate along the second cover member, the second cover member defining a through hole coaxial with the stepped through mounting hole; and
      a third cover member including an external screw thread and a peripheral end portion arranged opposite ends, the peripheral end portion received in the stepped through mounting hole of the first cover member;
   a camera assembly secured to the housing and partially exposed through the through hole of the second cover member and covered by the third cover member; and
   a locking assembly including a sleeve, the sleeve surrounding the camera assembly, the sleeve including an internal screw thread extending out of the through hole of the second cover member, the external screw thread of the third cover member screwing the internal screw thread for allowing the third cover member to be attached to the first cover member.

10. The portable electronic device as claimed in claim 9, wherein:
   the first cover member comprises a positioning member and two arcuate positioning flanges, the positioning member comprises a positioning projection projecting from a distal end, the two positioning flanges and the positioning projection are coplanar with each other and arranged along a circle, the circular projection is coaxial to the circle;
   the second cover member comprises a main portion and a circular projection in conjunction with the main portion, the conjunction of the main portion and the projection defines a positioning groove surrounding a portion of the projection;
   the positioning member and the arcuate positioning flanges slidably positioned in the positioning groove.

* * * * *